Patented June 4, 1929.

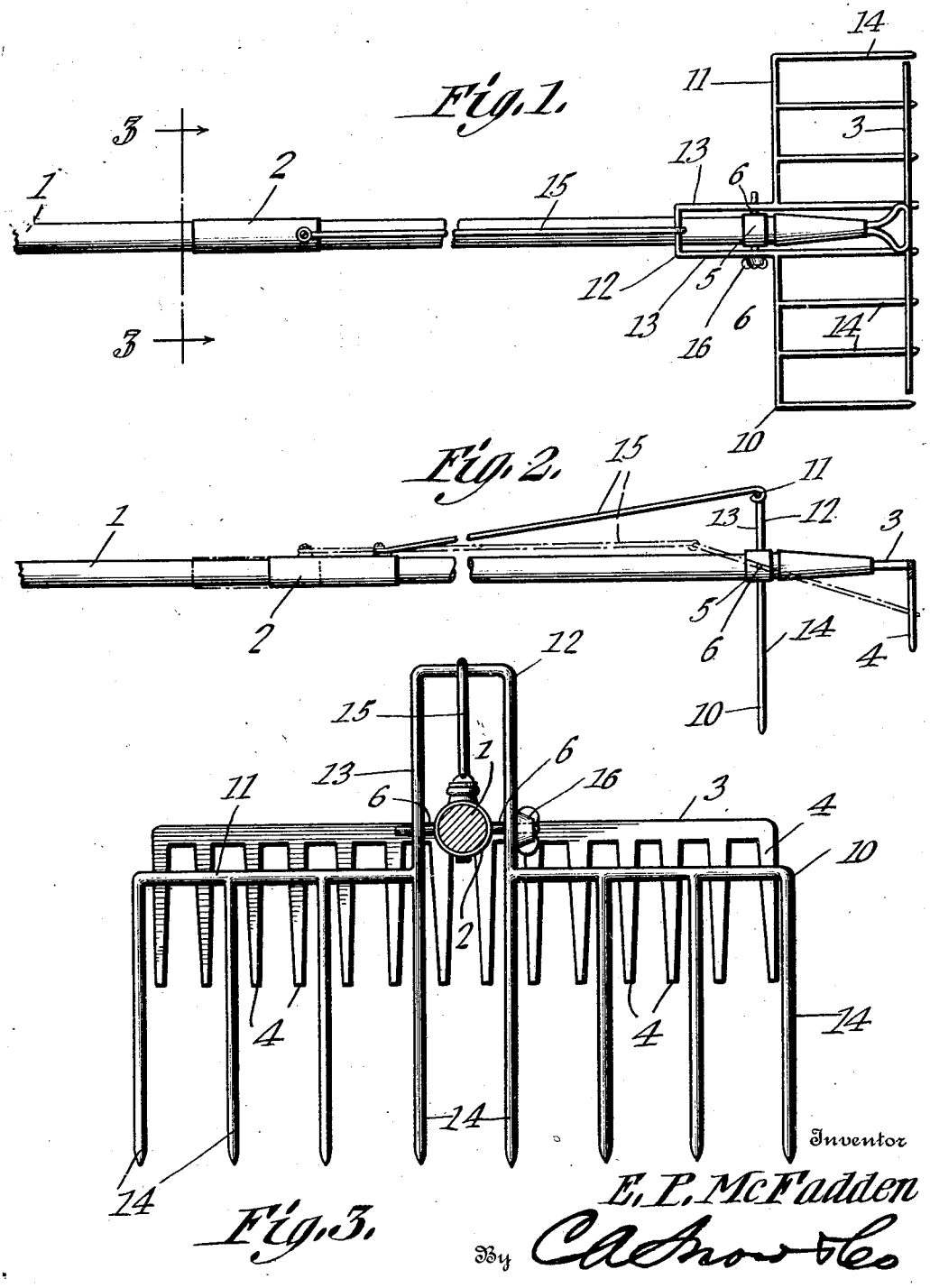

1,715,613

UNITED STATES PATENT OFFICE.

EURA P. McFADDEN, OF KENNETT, MISSOURI.

RAKE ATTACHMENT.

Application filed September 18, 1924. Serial No. 738,388.

This invention relates to garden rakes, the primary object of the invention being to provide a rake of this character equipped with a device for gathering and holding trash, grass and the like and carrying it to any desired dumping place where it may be released.

Another object of the invention is to provide means which may be used for raking deeper than with the ordinary rake, the construction being such that it will act as a means for cleaning the rake teeth when releasing the material held thereon.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 represents a top plan view of a rake constructed in accordance with the invention with the auxiliary rake shown in horizontal position, the teeth thereof being located at right angles to the teeth of the rake proper.

Figure 2 is a side elevation thereof with the auxiliary rake shown in operative position in full lines and in inoperative position in dotted lines.

Figure 3 is a transverse sectional view taken on line 3—3 of Figure 1 looking in the direction of the arrow.

In the embodiment illustrated, the rake embodying this invention includes a handle 1 of usual construction having a sleeve 2 slidably mounted thereon and equipped at its front end with the usual head 3 provided with teeth 4 such as are usually found in rake construction.

A collar 5 is fixed to the handle 1 at a point spaced inwardly from the head 3. The auxiliary rake 10 comprises a cross bar 11 having a U-shaped centrally disposed attaching member 12 the arms 13 of which are pivotally mounted intermediate their ends, preferably at a point slightly in rear of the cross bar 11 on journals 6 projecting laterally outwardly from diametrically opposite sides of the band 5. The teeth 14 of the auxiliary rake 10 are made considerably longer than the teeth of the rake head 3 and are positioned at a distance sufficient to enter between the alternate teeth 4 of the rake head. A rod 15 connects the cross bar of the U-shaped member 12 with the sliding sleeve 2.

One of the journals 6 is preferably threaded and equipped with a wing nut 16 adapted to clampingly secure the auxiliary rake head 10 in adjusted position. This trip rake is preferably constructed in a single piece of the same width as the rake head 3, the teeth 14 being sharpened to form prongs.

In the use of this attachment the wing nut 16 being loosened, the rake is held in ordinary position and the sleeve 2 moved rearwardly to the extreme limit, in which position the auxiliary rake 10 attains a horizontal position at right angles to the rake head 3, as is shown clearly in Figure 1.

Should the teeth of the rake 3 become clogged with grass or other trash, the rake head is raised and the sleeve 2 moved forwardly, thereby causing the rake head 10 to swing downwardly and the prongs of teeth 14 thereof to clean out the trash from between the teeth 4 of the rake head 3. The attachment may be used for lifting and conveying trash which has been raked up by clamping the trash between the heads 3 and 10 which is accomplished by moving the sleeve 2 rearwardly when the parts are in the position shown in Figure 2 which causes the head 10 to swing forwardly and the teeth thereof to pass under the débris which is held between the teeth 14 and the teeth 4. The operator may then swing the rake to one side and dump the trash in a pile or in a receptacle if one is provided. To dump the rake the sleeve 2 is simply moved forward which causes the teeth 14 to swing away from teeth 4 back to neutral position, thus releasing the trash.

When the sleeve 2 is moved forward to its extreme forward limit the auxiliary rake head 10 will swing flat against the lower face of the handle 1 with the points of the teeth extended inwardly and thus will be out of the way and permit the rake head to be used in the usual manner. When the auxiliary rake head is swung into the position shown in Figure 2 and locked by tightening the wing nut 16 the rake teeth 10 obviously being longer than those indicated by the reference character 4, may be used for raking deeper into the ground or for raking deeper trash than may be done with the teeth 4.

It will be understood that these various uses may be accomplished by the operator in one movement without changing position other than sliding the sleeve 2 back and forth on the handle according to the operation to be performed.

Obviously this attachment may be used in connection with any ordinary rake by simply mounting on the handle of such rake, the fixed sleeve or collar 5 and the slidable sleeve 2 and then journaling the auxiliary rake head 10 on the band 5 and connecting said rake by the rod 16 with the sleeve 2.

I claim:—

In combination with a rake, a collar secured to the handle of the rake at a point in spaced relation with the head of the rake, an auxiliary head embodying teeth, the last mentioned head having an upstanding central offset portion, pivot pins extending from the collar and positioned in openings formed in the offset portion, a sleeve movable on the handle of the rake and a rod connected with the sleeve and having pivotal connection with the upstanding portion of the auxiliary head to swing the auxiliary heads towards or away from the rake head.

In testimony that I claim the foregoing as my own, I have hereto affixed my signature.

EURA P. McFADDEN.